US012072258B2

(12) United States Patent
Ayer et al.

(10) Patent No.: US 12,072,258 B2
(45) Date of Patent: Aug. 27, 2024

(54) TORQUE SENSOR UNIT COMPRISING A MAGNETIC SHIELD

(71) Applicants: thyssenkrupp Presta AG, Eschen (LI); thyssenkrupp AG, Essen (DE)

(72) Inventors: Roman Ayer, Uster (CH); Peter Knoll, Lindau (DE); Sándor Kovács, Vecsés (HU); Peter Szabo, Budapest (HU); Tivadar Kristóf Tóth, Páty (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 218 days.

(21) Appl. No.: 17/435,179

(22) PCT Filed: Feb. 25, 2020

(86) PCT No.: PCT/EP2020/054904
§ 371 (c)(1),
(2) Date: Aug. 31, 2021

(87) PCT Pub. No.: WO2020/178078
PCT Pub. Date: Sep. 10, 2020

(65) Prior Publication Data
US 2022/0146347 A1 May 12, 2022

(30) Foreign Application Priority Data
Mar. 1, 2019 (DE) ............ 10 2019 105 234.3

(51) Int. Cl.
*G01L 3/10* (2006.01)
*B62D 3/12* (2006.01)
(Continued)

(52) U.S. Cl.
CPC ............ *G01L 3/104* (2013.01); *B62D 3/12* (2013.01); *B62D 15/022* (2013.01); *G01L 5/221* (2013.01)

(58) Field of Classification Search
CPC .......... G01L 3/104; G01L 5/221; B62D 3/12; B62D 15/022
See application file for complete search history.

(56) References Cited

U.S. PATENT DOCUMENTS

| 7,021,161 B2 | 4/2006 | Recio et al. |
| 8,087,306 B2 | 1/2012 | Goll et al. |

(Continued)

FOREIGN PATENT DOCUMENTS

| CN | 107662635 A | 2/2018 |
| CN | 108931327 A | 12/2018 |

(Continued)

OTHER PUBLICATIONS

English Translation of International Search Report issued in PCT/EP2020/054904, dated May 19, 2020.

*Primary Examiner* — Octavia Hollington
(74) *Attorney, Agent, or Firm* — thyssenkrupp North America, LLC

(57) ABSTRACT

A torque sensor unit may include a ring magnet that is connectable to a first partial shaft and is concentric with a longitudinal axis. Two first magnetic flux conductors are connectable to a second partial shaft, are arranged in a ring magnet magnetic field, and conduct magnetic fluxes. A spatially fixed sensor unit may have two second magnetic flux conductors and a magnetic sensor on a printed circuit board, all of which are receivable in a housing. The sensor unit can detect a change in a rotation angle between the partial shafts by measuring magnetic flux density between the first magnetic flux conductors. A second housing surrounds the ring magnet, the first magnetic flux conductors, and the sensor unit. A magnetic shield surrounds the sensor unit at least partially circumferentially relative to the longi- (Continued)

tudinal axis and is arranged between a housing cover closing the second housing and the second housing.

10 Claims, 5 Drawing Sheets

(51) Int. Cl.
  *B62D 15/02* (2006.01)
  *G01L 5/22* (2006.01)

(56) References Cited

U.S. PATENT DOCUMENTS

| | | |
|---|---|---|
| 2002/0189371 A1 | 12/2002 | Nakane et al. |
| 2003/0209087 A1 | 11/2003 | Nakane et al. |
| 2005/0050966 A1 | 3/2005 | Recio et al. |
| 2006/0137474 A1 | 6/2006 | Nakane et al. |
| 2017/0315004 A1 | 11/2017 | Toyama |
| 2018/0023980 A1 * | 1/2018 | Schoepe .............. G01D 5/2451 324/207.25 |
| 2018/0029634 A1 | 2/2018 | Toyama |
| 2018/0029638 A1 | 2/2018 | Toyama |
| 2018/0319440 A1 * | 11/2018 | Ernstson .............. B62D 5/0421 |
| 2018/0340853 A1 | 11/2018 | Berner et al. |
| 2022/0074801 A1 * | 3/2022 | Ayer ....................... G01L 3/104 |

FOREIGN PATENT DOCUMENTS

| | | | |
|---|---|---|---|
| CN | 109073487 B * | 6/2021 | ......... B62D 15/0215 |
| DE | 102 22 118 A1 | 11/2002 | |
| DE | 102012024383 A1 * | 6/2014 | ......... B62D 15/0215 |
| DE | 10 2015 122 179 A1 | 6/2017 | |
| DE | 10 2017 116 454 A1 | 1/2019 | |
| EP | 3181431 A1 * | 6/2017 | ............... B62D 6/10 |
| EP | 3239678 A1 | 11/2017 | |
| EP | 3276317 A1 | 1/2018 | |
| EP | 3276318 A1 | 1/2018 | |
| KR | 20150079982 A * | 7/2015 | |
| WO | 2019/016124 A1 | 1/2019 | |
| WO | WO-2023025378 A1 * | 3/2023 | |

\* cited by examiner

Section view A-A

TORQUE SENSOR UNIT COMPRISING A MAGNETIC SHIELD

CROSS REFERENCE TO RELATED APPLICATIONS

This application is a U.S. National Stage Entry of International Patent Application Serial Number PCT/EP2020/054904, filed Feb. 25, 2020, which claims priority to German Patent Application No. DE 10 2019 105 234.3, filed Mar. 1, 2019, the entire contents of both of which are incorporated herein by reference.

FIELD

The present disclosure generally relates to torque sensor units, including electromechanical power-assisted steering systems that include such torque sensor units.

BACKGROUND

The present invention relates to a torque sensor unit having the features of the preamble of claim 1 and to an electromechanical power-assisted steering system for a motor vehicle comprising such a torque sensor unit.

Torque sensors are used in a motor vehicle to measure the torque that is introduced into the steering wheel by a driver. Torque sensors currently used are magnetic sensors, the measurement of which can very easily be disrupted by external magnetic fields. Motor vehicles will in the future be, and to a certain extent currently already are, completely or partially electrically operated, which can lead to high external field-influencing measurements through high current-carrying cables, which are frequently located in the vicinity of the steering system. The Earth's magnetic field can likewise have an interfering influence on the sensors.

The prior art discloses a series of torque sensors which have a magnetic shield.

U.S. Pat. No. 7,021,161 B2 discloses a steering angle sensor which has a first gear wheel, which is connected to an upper steering shaft and engages with a second, smaller gear wheel, wherein the smaller gear wheel is surrounded by a shield which has a cutout for the first gear wheel. The shield delimits the magnetic field of the sensor of the second gear wheel.

Published documents EP 3 276 317 A1, EP 3 276 318 A1 and EP 3 239 678 A1 disclose torque sensor units comprising a magnetic shield which is C-shaped in cross section and circumferentially surrounds magnetic flux conductors that are arranged on the lower steering shaft.

Thus a need exists for a torque sensor unit in which an existing external interfering magnetic field has a reduced influence on the determination of the torque value and, in association, exhibits an increased degree of accuracy.

Accordingly, the invention provides a torque sensor unit, comprising:
- a ring magnet which can be connected in a rotationally fixed manner to a first partial shaft and is arranged concentrically in relation to a longitudinal axis,
- two first magnetic flux conductors which can be connected to the second partial shaft, are arranged in a magnetic field emanating from the ring magnet and conduct the magnetic fluxes,
- a spatially fixed sensor unit having two second magnetic flux conductors and a magnetic sensor, which is arranged on a printed circuit board, which are accommodated in a sensor housing of the sensor unit, wherein the sensor unit is designed to detect a change in the rotation angle between the partial shafts by measuring the magnetic flux density that is produced between the two first magnetic flux conductors,
- a second housing which surrounds the ring magnet, the two first magnetic flux conductors and the sensor unit, wherein the torque sensor unit comprises a magnetic shield which surrounds the sensor unit at least partially circumferentially and is arranged between a housing cover, which closes the second housing, and the second housing.

The magnetic shield shields the sensor unit from external interfering magnetic fields, as a result of which the signal quality can be considerably improved. The housing cover is preferably formed from steel. The shield is preferably clamped between the housing cover and the second housing.

The magnetic shield preferably has at least one supporting surface which interacts with a guide in the second housing. This renders possible simple insertion of the shield in the second housing.

It can be provided that the ring magnet is also at least partially surrounded circumferentially by the magnetic shield.

The magnetic shield preferably has two limbs which each have first and second sides, wherein the second sides extend parallel to the longitudinal axis and the first sides are arranged approximately perpendicular thereto. The limbs are preferably rectangular.

In order to simplify assembly, the limbs are connected to one another exclusively by way of one of their first or one of their second sides.

In this case, the limbs of the shield preferably each extend in a plane parallel to the longitudinal axis.

It can be provided that the magnetic shield has an opening for a data line and/or a power supply of the sensor element to pass through.

The sensor unit is preferably arranged at a distance from the ring magnet in the radial direction in relation to the longitudinal axis.

In a preferred embodiment, the shield is manufactured from a metal sheet. The metal sheet is preferably punched and bent for the purpose of forming the shield. It can also be provided to form the shield from a cold-worked metal.

The invention furthermore provides an electromechanical steering system for a motor vehicle, comprising a steering pinion which is connected to a second partial shaft and engages with a toothed rack, which is mounted in a third housing such that it can be displaced along a longitudinal axis, for steering wheels, at least one electric motor for steering force assistance, wherein the steering system furthermore comprises an above-described torque sensor unit which is arranged between a first partial shaft, which is connected to the steering wheel, and the second partial shaft and detects a torque that is introduced into the steering wheel by the driver for the purpose of controlling steering force assistance.

DETAILED DESCRIPTION

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
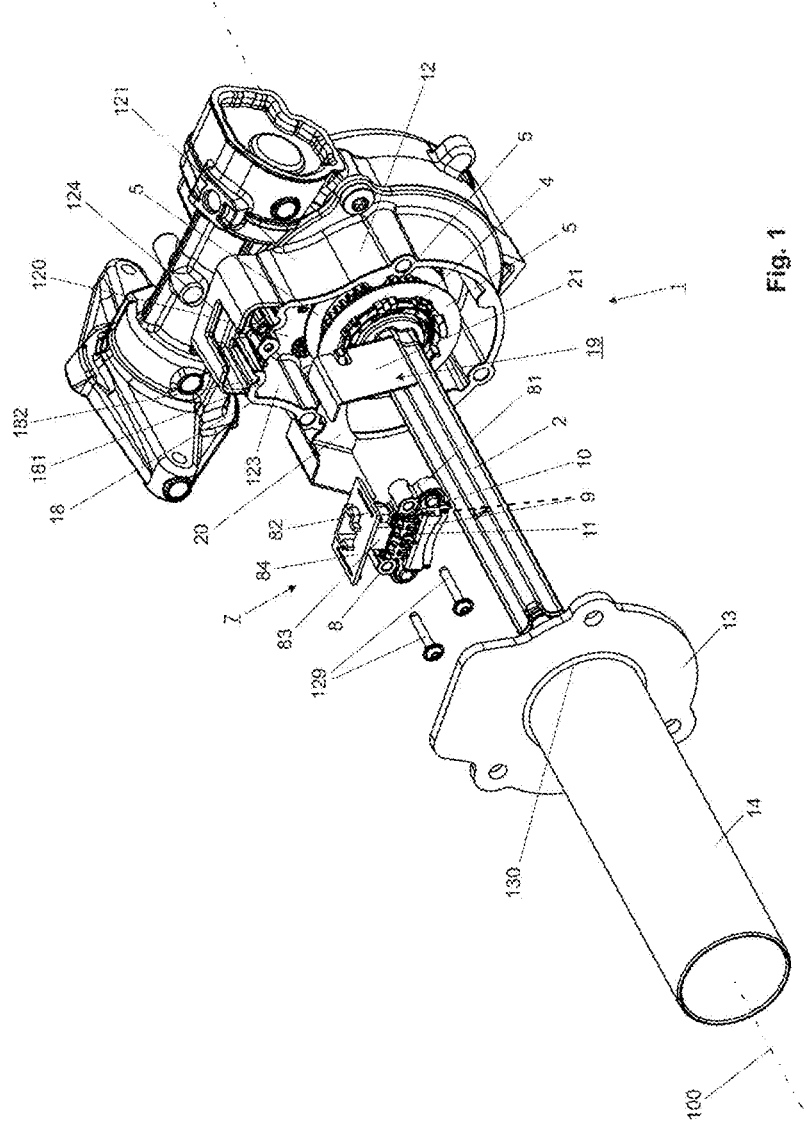
FIG. 1 is a perspective view of an example torque sensor unit.

FIG. 1 illustrates a torque sensor unit 1 which measures a rotation of an upper steering shaft 2 in relation to a lower steering shaft, not illustrated, as a measure of the torque exerted manually by a driver on the upper steering shaft or a steering wheel that is connected to the upper steering shaft. The upper steering shaft 2 and the lower steering shaft are coupled to one another in a rotationally elastic manner via a torsion rod, not shown. A torque sensor unit 1 has a rotation angle sensor, which is also called a torque sensor. Depending on the torque that is measured by the torque sensor unit 1, a servo unit provides steering assistance for the driver.

The torque sensor unit 1 has a ring magnet (permanent magnet) 4 which is connected in a rotationally fixed manner to the upper steering shaft 2 and has large number of poles. A set of magnetic flux conductors 5, which is fixed to the lower steering shaft, is arranged in a magnetic field that is generated by the multiple-pole magnet 4. Each of the magnetic flux conductors 5 is produced from a soft-magnetic material and has a plurality of claw poles, which are arranged equidistantly in the circumferential direction. The two magnetic flux conductors 5 are arranged such that their claw poles interengage. The multiple-pole magnet 4 and the assembled magnetic flux conductors 5 are arranged such that the center of each claw pole of the magnetic flux conductors 5 coincides with a magnetic boundary line (i.e. a boundary between an N pole and an S pole) in order to obtain a neutral point at which the output signal (the output voltage) of the magnetic field sensor becomes zero if the torsion rod is not twisted (i.e. when no steering force is transmitted between the upper steering shaft and the lower steering shaft).

The magnetic flux conductors 5 conduct and "collect" the magnetic fluxes. A spatially fixed sensor unit 7 detects the magnetic flux density that is produced in an air gap between the magnetic flux conductors 5 that are situated opposite each other in the axial direction.

The sensor unit 7 has a sensor housing 8, also called the first housing in the text which follows, and, arranged therein, a magnetic flux conductor 9 and a magnetic sensor 11 which is arranged on a printed circuit board 10. The flux conductors 5, 9 serve to concentrate the magnetic flux on the magnetic sensor 11. The magnetic sensor 11 detects the rotation of the upper steering shaft 2, which is connected to the magnet ring 4, in relation to the lower steering shaft, which is connected to the magnetic flux conductors 5. During assembly, the first housing 8 of the sensor unit 7 is inserted into a second housing 12 of the torque sensor unit 1.

In the assembled state, the second housing 12 of the torque sensor unit surrounds the ring magnet 4, the set of magnetic flux conductors 5 and the sensor unit 7. The second housing 12 of the torque sensor unit has a base surface 120 which functions as a base and onto which an outer wall 121 which serves as an edge and is arranged substantially perpendicularly on the base 120 is placed. The outer wall 121 is preferably welded onto the base 120. The outer wall 121 and the base 120 are preferably formed in one piece in a punching operation. As an alternative, the part is prepared in a casting process, preferably aluminum die casting. The outer wall 121 encircles the entire torque sensor unit 1 circumferentially. The second housing 12 has, on the side that is remote from the base, an opening 123. This opening 123 opens the housing 12 toward the upper steering shaft 2. The opening 123 is covered by a housing cover 13. The housing cover 13 has a cutout 130 through which the upper steering shaft 2 passes in the installed state. The housing cover 13 is connected, preferably welded, to an inner casing tube 14 of a steering column. The inner casing tube 14 is inserted into the cutout 130. The inner casing tube 14 is part of an adjustable steering column. It is surrounded by an outer casing tube, not illustrated, and the two casing tubes are designed to be telescopic relative to each other.

The second housing 12 has a housing opening 124 in the edge 121, in the region of the sensor element 7. The sensor element 7 can be connected to a data line and to a power supply through the housing opening 124.

The sensor housing 8 is fixed to the second housing 12 by means of screws 129. The housing cover 13 is likewise firmly screwed to the second housing 12.

The sensor unit 7 is surrounded by the first housing 8 which has a first region 81 in which the flux conductor 9, the printed circuit board 10 and the magnetic sensor 11 are accommodated. In a second region 82, which adjoins the first region 81, the first housing 8 is configured in the shape of a T in longitudinal section. To form the T shape, the first housing 8 has a neck 83 which, when the sensor unit 7 is in the assembled state, extends in the radial direction of the longitudinal axis 100 of the torque sensor unit and is adjoined by a transversely situated web 84. The transversely situated web 84 is plate-like and, in the installed state, lies on both sides, in each case on an inwardly directed projection 18 of the edge 121 of the second housing 12. Each projection has two contact surfaces 181, 182, which form a kind of guide for the introduction of the sensor unit 7 into the second housing 12.

The second housing 12 is manufactured from aluminum and is therefore not suitable for shielding magnetic fields.

An additional shield 19 is required, which at least partially surrounds the sensor housing 8 and is accommodated, together with the sensor housing 8, in the second housing 12 of the torque sensor unit. This shield 19 is formed from a magnetically conductive material.

Soft-magnetic materials with a high degree of permeability, such as-nickel-iron alloys or iron-silicon alloys, are particularly suitable.

Figure 4:
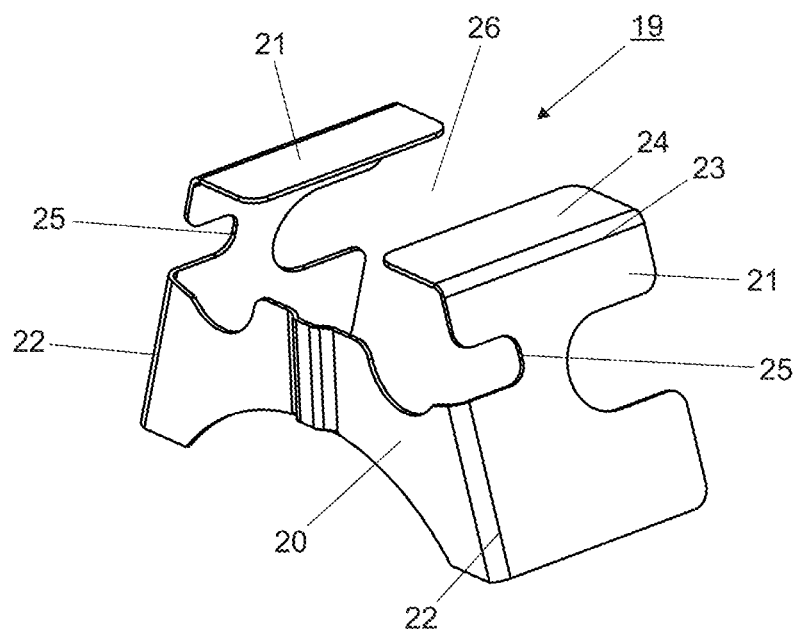
FIG. 4 is a perspective view of an example shield.
Figure 5:
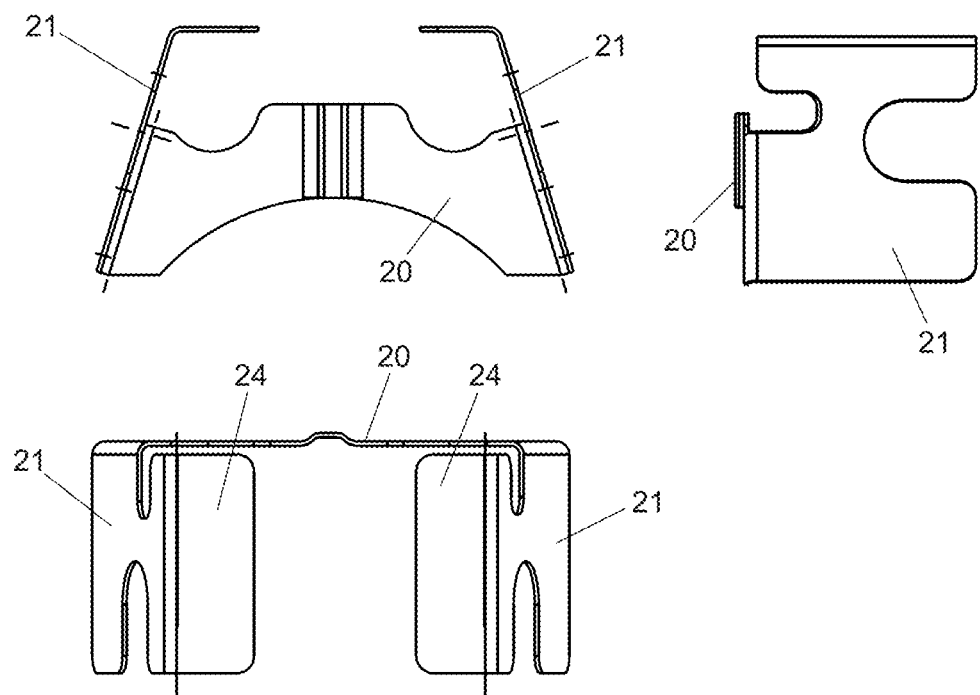
FIG. 5 shows front, bottom, and side views of the shield from FIG. 4.

The shield 19 has two substantially rectangular limbs 21 which are connected via a rear side 20. It is illustrated in detail in FIGS. 4 to 6. The two limbs 21 emanate substantially perpendicularly from the rear side 20, which engages on one of the first sides of the limbs 22 which extend in a plane perpendicular to the longitudinal axis 100. On the side that is remote from the sensor, the limbs 21 each have, on one of the two sides 23, an inwardly directed bent portion 24. The limbs 22 each have a cutout 25 which extends parallel to the longitudinal axis of the shafts 100 and serves as a guide for pushing the shield onto the projections which are arranged on the base 120 of the second housing 12. The projections lie between the shaft and the inwardly directed projections 18. The entire shield 19 lies below the projections 18. The limbs 21 shield the entire sensor unit 7 toward the side.

An opening 26 through which the connections for the sensor unit 7 can be passed is formed between the bent portions 24. The shield 19 is open on the side that is remote from the transmission. In this embodiment, during assembly of the torque sensor unit 1, first the shield 19 and then the sensor unit 7 is inserted into the second housing 12. In a next step, the housing cover 30 closes the shield 19 toward the side that is remote from the transmission. The shield 19 is therefore clamped between the second housing 12 and the housing cover 13 during assembly and secured in that position. The shield 19 and the housing cover 13 form a closed box which shields against interfering magnetic fields. The housing cover 13 is preferably manufactured from steel.

Figure 2:
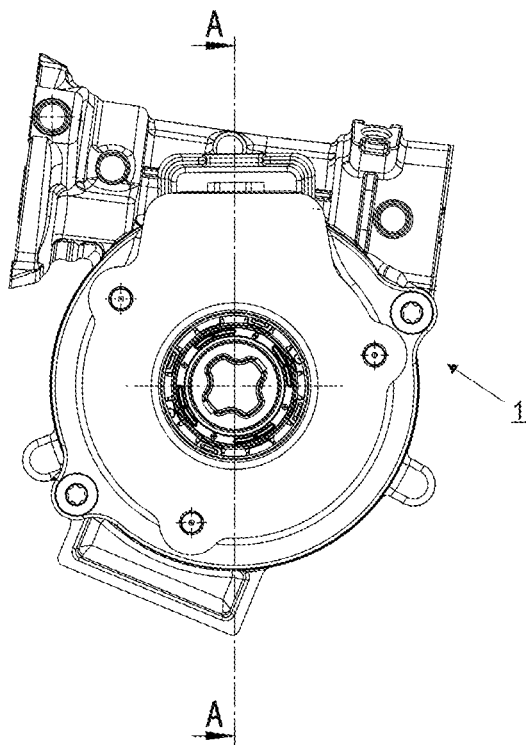
FIG. 2 is a side view of a fully assembled torque sensor unit in a direction of a longitudinal axis of a shaft.
Figure 3:
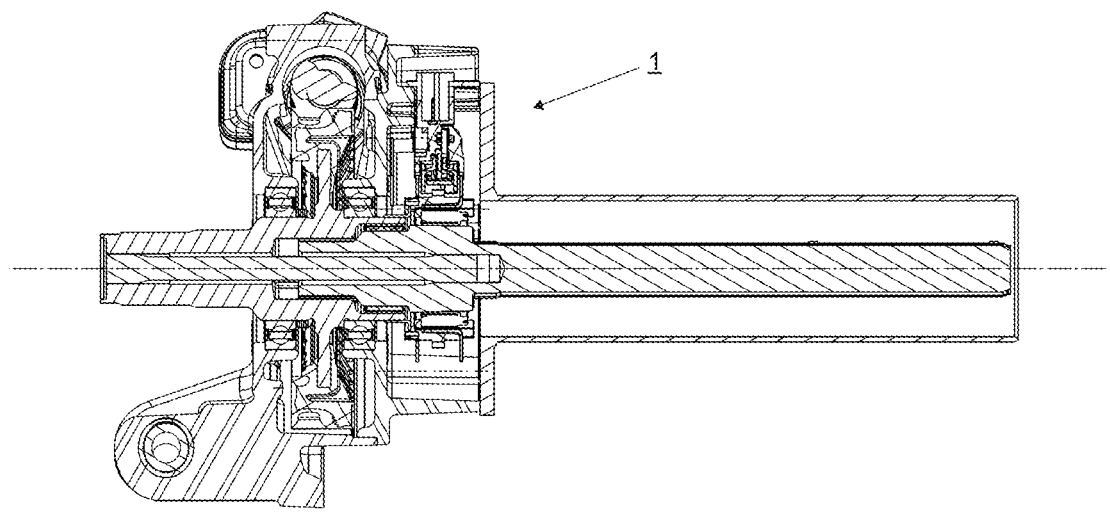
FIG. 3 is a longitudinal sectional view across line A-A in FIG. 2 of the torque sensor unit.

FIGS. 2 and 3 show the fully assembled torque sensor unit 1. In another embodiment, it can be provided that the two limbs are connected by means of their second sides, which extend parallel to the longitudinal axis. In this case, the connecting wall lies on the side that is remote from the ring magnet. Said connecting wall has a cutout which at least partially encircles the neck of the sensor unit. In this case, first the sensor unit and then the shield is introduced into the second housing during assembly. In the installed state, the connecting wall lies between the projections of the second housing and the first region of the sensor housing.

Figure 6:
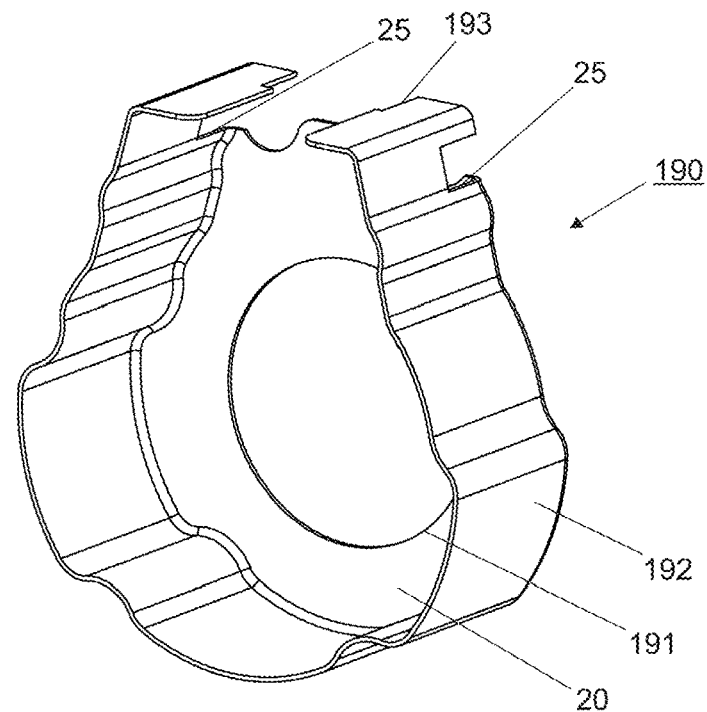
FIG. 6 is a perspective view of another example shield.
Figure 7:
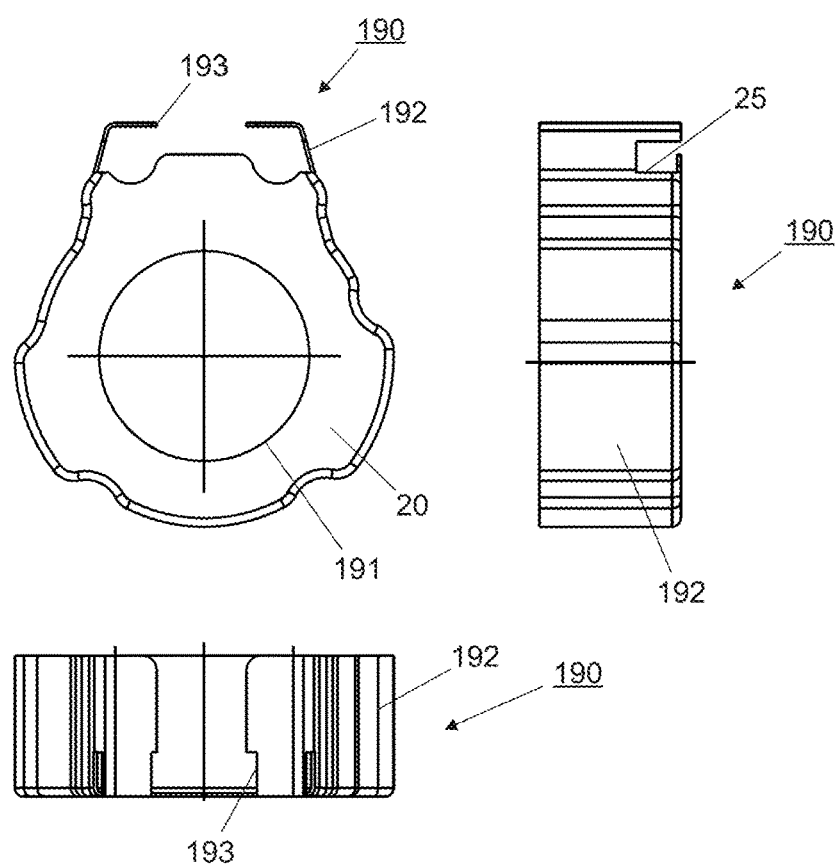
FIG. 7 shows several views of the shield from FIG. 6.

FIGS. 6 and 7 show a further embodiment of a shield 190 which, in the installed state, surrounds the sensor housing circumferentially completely apart from a small interruption 193 for the neck of the first housing to pass through. The rear side 20 of the shield 190 has a round opening 191 for the shaft to pass through. An edge 192, which has the interruption 193 in a region for the neck of the first housing to pass through, extends approximately perpendicularly from the circumferential side of the rear side 20. The shield 190 is dimensioned such that it surrounds the magnetic flux conductors and the ring magnet circumferentially. The shield 190 has cutout 25 in the rear side 20 and in the edge 192, which cutout extends parallel to the longitudinal axis of the shaft and serve as a guide for pushing the shield onto projections which are arranged on the base of the second housing. As already described above, the shield 190 is also clamped between the second housing and the housing cover during assembly. In so doing, the housing cover overlaps the edge 192 and lies on its end side.

Figure 8:
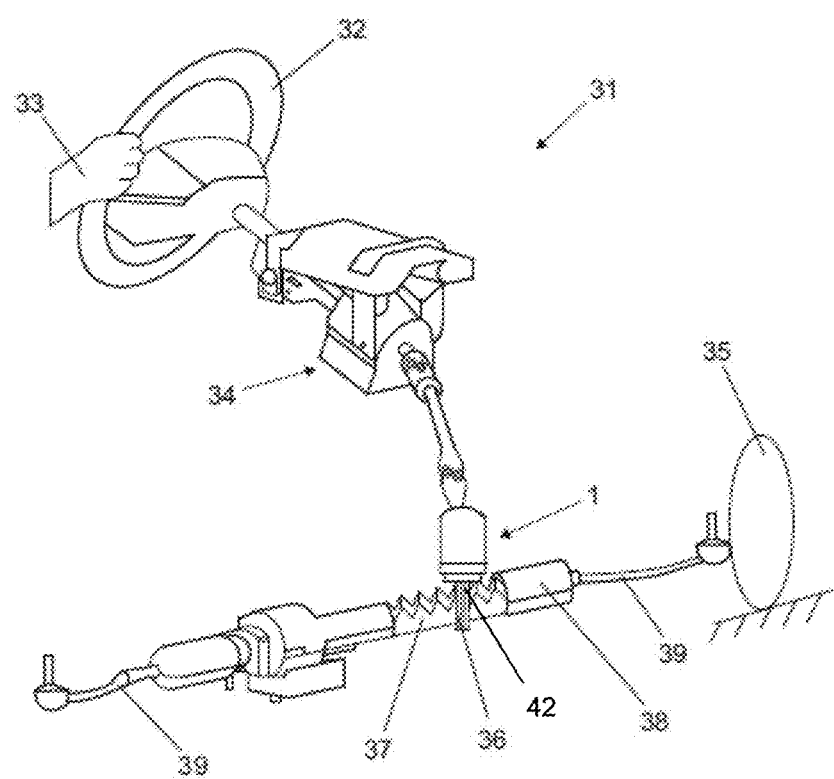
FIG. 8 shows a system view according to the disclosure.

With additional reference to FIG. 8, the disclosure furthermore provides an electromechanical steering system 31 for a motor vehicle, comprising a steering pinion 36 which is connected to a second partial shaft 42 and engages with a toothed rack 37, which is mounted in a third housing 38 such that it can be displaced along a longitudinal axis, for steering wheels 35, at least one electric motor 34 for steering force assistance, wherein the steering system 31 furthermore comprises an above-described torque sensor unit which is arranged between a first partial shaft, which is connected to the steering wheel 32, and the second partial shaft and detects a torque that is introduced into the steering wheel by a driver 33 for the purpose of controlling steering force assistance.

What is claimed is:

1. A torque sensor unit comprising:
    a ring magnet that is connectable in a rotationally fixed manner to a first partial shaft and is disposed concentrically relative to a longitudinal axis;
    two first magnetic flux conductors that are connectable to a second partial shaft, that are disposed in a magnetic field emanating from the ring magnet, and that conduct magnetic fluxes;
    a spatially fixed sensor unit having two second magnetic flux conductors and a magnetic sensor that is disposed on a printed circuit board, wherein the two second magnetic flux conductors and the magnetic sensor are received in a sensor housing of the spatially fixed sensor unit, wherein the spatially fixed sensor unit is configured to detect a change in a rotational angle between the first and second partial shafts by measuring magnetic flux density between the two first magnetic flux conductors;
    a second housing that surrounds the ring magnet, the two first magnetic flux conductors, and the spatially fixed sensor unit; and
    a magnetic shield that surrounds at least part of the torque sensor unit at least partially circumferentially relative to the longitudinal axis, the magnetic shield being disposed between a housing cover, which closes the second housing, and the second housing in a direction of the longitudinal axis, wherein the magnetic shield includes two limbs that each have first and second sides, wherein the second sides extend parallel to the longitudinal axis and the first sides are generally perpendicular to the longitudinal axis, wherein the two limbs are connected to one another exclusively by way of one of the first sides or one of the second sides.

2. The torque sensor unit of claim 1 wherein the magnetic shield includes a supporting surface that interacts with a guide in the second housing.

3. The torque sensor unit of claim 1 wherein the magnetic shield shields the sensor housing in a region of an outer side that is remote from the ring magnet.

4. The torque sensor unit of claim 1 wherein the magnetic shield is clamped into the second housing via the housing cover.

5. The torque sensor unit of claim 1 wherein the magnetic shield includes an opening through which at least one of a data line or a power supply of the spatially fixed sensor unit passes.

6. The torque sensor unit of claim 1 wherein the spatially fixed sensor unit is spaced apart from the ring magnet in a radial direction relative to the longitudinal axis.

7. The torque sensor unit of claim 1 wherein the magnetic shield is comprised of metal sheet.

8. The torque sensor unit of claim 7 wherein the magnetic shield includes punches and a bend.

9. The torque sensor unit of claim 1 wherein the magnetic shield is comprised of cold-worked metal.

10. An electromechanical steering system for a motor vehicle, comprising:
    the torque sensor unit of claim 1;
    a steering pinion that is connected to the second partial shaft of the torque sensor unit and engages with a toothed rack, which is mounted in a third housing such that the toothed rack is displaceable along a longitudinal axis for steering wheels; and
    an electric motor for steering force assistance,
    wherein the first partial shaft of the torque sensor unit is connected to a steering wheel, wherein the torque sensor unit is configured to detect torque introduced into the steering wheel by a driver, wherein at least part of the torque sensor unit is disposed between the first and second partial shafts.

\* \* \* \* \*